(12) United States Patent
Bauer et al.

(10) Patent No.: US 7,933,104 B2
(45) Date of Patent: Apr. 26, 2011

(54) SAFETY SWITCHING APPARATUS FOR A FAILSAFE DISCONNECTION OF AN ELECTRICAL LOAD

(75) Inventors: Ralf Bauer, Stuttgart (DE); Guenter Hornung, Leinfelden-Echterdingen (DE); Thomas Nitsche, Esslingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 235 days.

(21) Appl. No.: 12/117,844

(22) Filed: May 9, 2008

(65) Prior Publication Data

US 2008/0278875 A1   Nov. 13, 2008

Related U.S. Application Data

(63) Continuation of application No. PCT/EP2006/010056, filed on Oct. 19, 2006.

(30) Foreign Application Priority Data

Nov. 11, 2005   (DE) .......................... 10 2005 055 325

(51) Int. Cl.
*H02H 3/08* (2006.01)
(52) U.S. Cl. ....................................................... 361/93.1
(58) Field of Classification Search .................. 361/93.1
See application file for complete search history.

(56) References Cited

U.S. PATENT DOCUMENTS

| | | | | |
|---|---|---|---|---|
| 3,794,950 A | * | 2/1974 | Kilner | 338/23 |
| 5,790,391 A | * | 8/1998 | Stich et al. | 363/24 |
| 5,894,274 A | | 4/1999 | Kienapfel et al. | |
| 6,051,894 A | | 4/2000 | Shimogama | |
| 6,198,612 B1 | | 3/2001 | Männer | |
| 2001/0024125 A1 | | 9/2001 | Groenewold et al. | |
| 2001/0027352 A1 | | 10/2001 | Morita et al. | |

FOREIGN PATENT DOCUMENTS

| | | |
|---|---|---|
| DE | 44 23 704 C1 | 10/1995 |
| DE | 197 02 009 A1 | 7/1998 |
| DE | 198 05 722 A1 | 9/1999 |
| DE | 100 33 073 A1 | 8/2001 |
| DE | 197 58 332 B4 | 5/2005 |
| EP | 1 307 793 B1 | 3/2004 |

* cited by examiner

OTHER PUBLICATIONS

Pilz; Operating Instructions No. 19 238-01, pp. 1-6, Nov. 2004.

*Primary Examiner* — Jared J Fureman
*Assistant Examiner* — Nicholas Ieva
(74) *Attorney, Agent, or Firm* — Harness, Dickey & Pierce, P.L.C.

(57) ABSTRACT

A safety switching apparatus for failsafe disconnection of an electrical load has a first and a second connecting terminal for connecting a first signaling switch and a third and a fourth connecting terminal for connecting a second signaling switch. It also has a first and a second output switching element, which are designed to produce a redundant output switching signal. The first connecting terminal is connected to a first potential and the third connecting terminal is connected to a second potential. The potentials differ from one another. In addition, the second connecting terminal is coupled to the first switching element in such a way that the first switching element receives the first potential via the first signaling switch. Likewise, the fourth connecting terminal is coupled to the second switching element in such a way that the second switching element receives the second potential via the second signaling switch. According to one aspect of the invention, a circuit arrangement is provided for determining at least one further potential at the second and/or fourth connecting terminal, and said circuit arrangement is designed to control the redundant output switching signal as a function of the further potential.

26 Claims, 3 Drawing Sheets

US 7,933,104 B2

SAFETY SWITCHING APPARATUS FOR A FAILSAFE DISCONNECTION OF AN ELECTRICAL LOAD

CROSS REFERENCES TO RELATED APPLICATIONS

This application is a continuation of international patent application PCT/EP2006/010056, filed on Oct. 19, 2006 designating the U.S., which international patent application has been published in German language as WO 2007/054187 and claims priority from German patent application DE 10 2005 055 325.7, filed on Nov. 11, 2005. The entire contents of these priority applications are incorporated herein by reference.

BACKGROUND OF THE INVENTION

The present invention relates to a safety switching apparatus for failsafe disconnection of an electrical load, in particular in an automatically operated installation. In particular embodiments, the invention relates to a compact safety switching device having redundant relay contacts for disconnecting a power supply path to the load.

Safety switching apparatuses in terms of the present invention are typically used in order to switch off a dangerous machine or installation in a failsafe manner when this is necessary to protect personnel. The safety switching apparatuses typically monitor the signals from emergency-off buttons, protective-door switches, light barriers, light grids and other safety signaling devices, and they are designed to interrupt an electrical power supply path as a function of these signals. As can easily be understood, it is of major importance to ensure the safety function, which means that faults in the area of the safety switching apparatus are either brought under control and/or are identified at an early stage. Safety switching apparatuses therefore typically have a redundant design and/or build-in self-test functions. At least when the safety requirements are stringent, the signals to the safety switching apparatus are also designed to be redundant.

The fail safety which can be achieved by the redundancy is lost, however, if a short occurs in the connecting lines between the signaling devices and the safety switching apparatus. A safety switching apparatus in accordance with higher level safety categories 3 and 4 of European Standard EN 954-1 (or in accordance with similar requirements) therefore requires short identification. In a prior art safety switching device manufactured and sold by the assignee Pilz GmbH & Co. KG under the brand name PNOZ® X2, this is achieved in that a two-channel signaling device, for example an emergency-off button with two redundant break contacts, is connected by separate lines to the connecting terminals, with the first potential being applied to a first break contact of the emergency-off button, while a second potential is applied to the second break contact. The operating voltage, for example of 24 V, is typically used as the first potential while the second potential is an opposing potential, in particular ground potential. Internally, the safety switching apparatus is designed such that a short between the connecting lines of the signaling device, for example as a result of a cable being crushed, leads to an electrical short circuit in the safety switching apparatus, and this short circuit results in a major rise in the current flowing into the safety switching apparatus. The increased current trips a fuse which is arranged in the input circuit of the safety switching apparatus. As a result, the output switching elements are switched off. This known approach, however, has the disadvantage that the trigger point at which the fuse is tripped (as an overcurrent identification element) is dependent on the temperature, and is therefore inaccurate.

DE 44 23 704 C1 discloses another approach for identification of shorts in safety switching apparatuses. In this case, each of the output sided switching elements is connected to a common ground potential with one of their terminals, while the respective other terminals are connected to a different positive and negative potential. This approach, however, is dependent on the safety switching apparatus being supplied with an AC voltage, from which the positive and negative potentials are produced. This known approach therefore cannot be transferred directly to safety switching apparatuses which are supplied with DC voltage.

DE 197 58 332 B4 discloses another safety switching apparatus, wherein an overcurrent identification element in the form of an electronic fuse is used in the input circuit. In order to prevent an automatic restart of a monitored machine or installation after a short has been rectified, an optocoupler is arranged in parallel with the fuse in this case. When the fuse trips, the optocoupler short circuits the input circuit of the safety switching apparatus and latches itself in this position. This known safety switching apparatus, however, has the disadvantage mentioned above, namely the tripping point of the fuse is dependent on temperature and is therefore inaccurate.

In addition to the approaches discussed so far, namely approaches using steady-state potentials on the signaling lines, there are also dynamic approaches for identification of shorts. For example, reference is made to DE 100 33 073 A1, DE 197 02 009 C2 and DE 198 05 722 A1. The dynamic approaches use signals having different clocks on the connecting lines to the signaling devices. The signals on the separate signaling lines can therefore be distinguished from one another, and a short can be identified. Dynamic approaches have the disadvantage that at least two different clock signals must be provided, which involves complexity and makes the devices more expensive.

SUMMARY OF THE INVENTION

Against this background, it is an object of the present invention to provide a simple and low-cost safety switching apparatus by means of which faults in the external circuitry can be identified reliably and as early as possible.

According to one aspect of the invention, there is provided a safety switching apparatus for use in an installation comprising a first signaling switch, a second signaling switch and an electrical load which is to be failsafely disconnected as a function of the first and second signaling switches, the safety switching apparatus comprising a first and a second connecting terminal for connection of the first signaling switch, a third and a fourth connecting terminal for connection of the second signaling switch, at least one first and one second switching element configured to produce a redundant output switching signal for disconnection of the load, and a circuit arrangement configured to control the first and second switching elements, wherein the first connecting terminal is supplied with a first steady-state potential, wherein the third connecting terminal is supplied with a second steady-state potential, which is different from the first steady-state potential, wherein the second connecting terminal is coupled to the first switching element in such a manner that the first switching element receives the first steady-state potential via the first signaling switch, wherein the fourth connecting terminal is coupled to the second switching element such that the second switching element receives the second steady-state potential via the second signaling switch, and wherein the circuit arrangement is configured to determine at least one further potential existent on at least one of the second and fourth connecting terminals, with the circuit arrangement being configured to control the first and second switching elements as a function of said further potential.

According to another aspect, there is provided a safety switching apparatus for failsafe disconnection of an electrical load, comprising a housing, a first and a second terminal arranged on the housing for connecting a first external signaling switch, a third and a fourth terminal arranged on the housing for connecting a second external signaling switch, at least one fifth terminal arranged on the housing for connecting the electrical load, at least one first and one second switching element arranged in the housing and configured to produce a redundant output switching signal supplied to the fifth terminal, and a circuit arrangement arranged in the housing, wherein the first connecting terminal is internally connected to a first steady-state potential, wherein the third connecting terminal is internally connected to a second steady-state potential which is different from the first steady-state potential, wherein the second connecting terminal is coupled to the first switching element such that the first switching element can be connected to the first steady-state potential via the first signaling switch, wherein the fourth connecting terminal is coupled to the second switching element such that the second switching element can be connected to the second steady-state potential via the second signaling switch, and wherein the circuit arrangement is configured to detect at least one further potential at the second or fourth connecting terminal, and to control the at least one first and one second switching elements as a function of the detected further potential The novel safety switching apparatus is based on the steady-state approach and therefore requires no clock signals or clock generators. It uses two mutually different steady-state potentials on the connecting lines to the signaling device in order to identify shorts, preferably without any supplementary or modulated clocks. In order to identify any shorts, the potential (which is necessarily steady state) is measured or otherwise detected at the second and/or fourth connecting terminal and is compared with an expected potential value there. Such a comparison allows for reliable short identification without dynamic clock signals. The novel safety switching apparatus can thus be produced at similarly low cost as the known steady-state approaches. If the steady-state potentials are provided from within the safety switching apparatus, which is preferred, not only clock generators can be dispensed with, but also connecting terminals for outputting the clock signals, thus allowing a very small implementation with a high safety category.

Furthermore, the novel safety switching apparatus can be produced regardless of the type of electrical power supply being used, i.e. it can be produced both with a DC voltage supply and with an AC voltage supply. This allows increased quantities and further contributes to a low-cost implementation.

The further potential at the second and/or fourth connecting terminal may be determined in the form of a measured value which is quantitatively compared with the known first and second potentials. Alternatively or in addition, the further potential can also be determined qualitatively by means of a threshold value comparison. In this case, "all" that is checked is whether the further potential is greater or less than a defined threshold value. This implementation is particularly cost-effective and is adequate for safety use, since all that is necessary in this case is to identify whether a short is present. In particularly preferred embodiments, there is no need to look for any differences between the potentials at the connecting terminals, but just to monitor whether the potentials at these terminals correspond to the ratios resulting from the circuit design where there are no faults in the circuitry. This especially makes it possible to dispense with the provision and application of two or more different dynamic signals.

The novel safety switching apparatus can also advantageously be used to identify whether the line resistance of the connecting lines is within a permissible range. This is particularly advantageous when the novel safety switching apparatus uses an overcurrent identification element (which is known per se) in the input circuit since, in these situations, the permissible line resistance in the connecting layers to the signaling devices has, until now, had to be limited by means of an installation regulation in order to ensure reliable tripping. The present invention allows early and automatic disconnection if the line resistance reaches an unacceptably high value.

Finally, the novel safety switching apparatus has the advantage that the short identification—in contrast to the steady-state methods used until now—is possible even before the switching elements have been closed, and therefore before the machine or installation has been switched on. With the prior art safety switching apparatuses using steady-state short identification, the overcurrent identification element could not trip in the event of a short until the switching elements on the output side had been closed.

In summary, the novel safety switching apparatus allows early and reliable identification of shorts with steady-state signals on the connecting lines to the signaling device. The object mentioned above is therefore completely achieved.

In a preferred refinement, the circuit arrangement is designed to monitor the further potential relative to the first potential.

Preferably, the circuit arrangement according to this refinement relates the further potential to the first or second potential and monitors whether the ratio remains within a defined value range, for example in the form of a quotient. Alternatively or in addition to this the circuit arrangement could also compare the further potential as an absolute measured value with a threshold value, the first and/or the second potential. In the preferred refinement, however, the circuit arrangement is independent of the absolute magnitude of the first and second potentials. This refinement can therefore be operated with different supply voltages without any adaptations.

In a further refinement of the invention, the magnitude of the first potential is high, the magnitude of the second potential is low, and the circuit arrangement is designed to open at least one of the switching elements when the magnitude of the further potential is less than a defined threshold value.

Not every short in the connecting lines to the signaling switches is equally dangerous to the operation of the safety switching apparatus. Shorts that directly result in a situation where it is no longer possible to identify actuation of the signaling switches and/or where it is no longer possible to open the output switching elements are particularly dangerous. The present refinement provides a very simple and cost-effective means of immediately identifying these dangerous shorts since a potential with a low magnitude on the second and/or fourth connecting terminal must be the result of such a dangerous short, as will be explained in the description of exemplary embodiments further below.

In a further refinement, the at least one further potential includes a third potential on the second connecting terminal and a fourth potential on the fourth connecting terminal.

This refinement allows duplicated monitoring for the "most dangerous" short, namely a connection between the second and fourth connecting terminals. This refinement therefore leads to enhanced safety in a highly cost-effective manner.

In a further refinement, the circuit arrangement is designed to determine the first potential. In further preferred refinements, the circuit arrangement can also be designed to determine the second potential as well.

Generally, the first and the second potential in a safety switching apparatus are known on the basis of the supply voltage. However, determination of these potentials by measurement allows even more accurate monitoring taking account of potential fluctuations. In addition, the safety switching apparatus can be automatically matched to different supply voltages in this refinement.

In a further refinement, the circuit arrangement is of redundant design.

This refinement allows failsafe monitoring of the external circuitry just by means of the new approach.

In a further refinement, the circuit arrangement comprises at least one integrated circuit, in particular a microcontroller, which is coupled to the second and/or fourth connecting terminal.

Coupling of the integrated circuit to the second and/or fourth connecting terminal may include intermediate components provided that the circuit is able to measure the further potential. The refinement is advantageous, since the novel safety switching apparatus can be designed with few components and in a highly cost-effective manner in this way.

In a further refinement, the circuit arrangement includes a switching unit which is designed to briefly connect the second switching element in parallel with the second signaling switch.

In other words, the switching unit in this refinement is designed to short circuit the second switching element via the signaling switch. When there is no short in the external circuitry, there must be no voltage on the second switching element during this switching time, and this can easily be checked by means of the further potential. This refinement is particularly advantageous in addition to direct measurement of the further potential, since this allows redundancy to be provided in a cost-effective manner.

In a further refinement, the switching unit includes a diode bridge in which the second switching element is arranged.

This refinement allows a very low-cost implementation in those situations where the second switching element is combined with polarized components, such as electrolytic capacitors, as is often advantageous in the case of safety switching apparatuses of this type.

In a further refinement, the circuit arrangement includes a threshold value sensor, in particular an optocoupler, which is designed to determine the further potential.

In this refinement, the further potential is not determined in the form of a measured value but only to determine whether the further potential is greater than or less than a threshold value. Since short identification essentially relates to detection of whether a short is present or not, qualitative evaluation of this kind is adequate. Furthermore, this can be done at very low cost and particularly advantageously in conjunction with a switching unit as described further above.

In a further refinement, the safety switching apparatus includes an overcurrent identification element, in particular in the form of a PTC thermistor, which is designed to open at least one of the switching elements in the event of an overcurrent.

This refinement combines the novel procedure with the known steady-state method for protection against shorts. This combination is particularly advantageous because the novel potential detection also makes it possible to check the line resistance of the connecting lines (even without a short). This allows further enhancement of the safety which until now has been achieved solely by installation regulations. On the other hand, use of an overcurrent identification element, such as in the form of a PTC thermistor, is a highly reliable, low-cost and proven method for quickly and reliably disconnecting a monitored machine in the event of a short.

It goes without saying that the features mentioned above and those explained in the following text can be used not only in the respectively disclosed combination but also in other combinations or on their own without departing from the scope of the present invention.

BRIEF DESCRIPTION OF THE DRAWINGS

Exemplary embodiments of the invention will be explained in more detail in the following description, and are illustrated in the drawing, in which.

DESCRIPTION OF PREFERRED EMBODIMENTS

Figure 1:
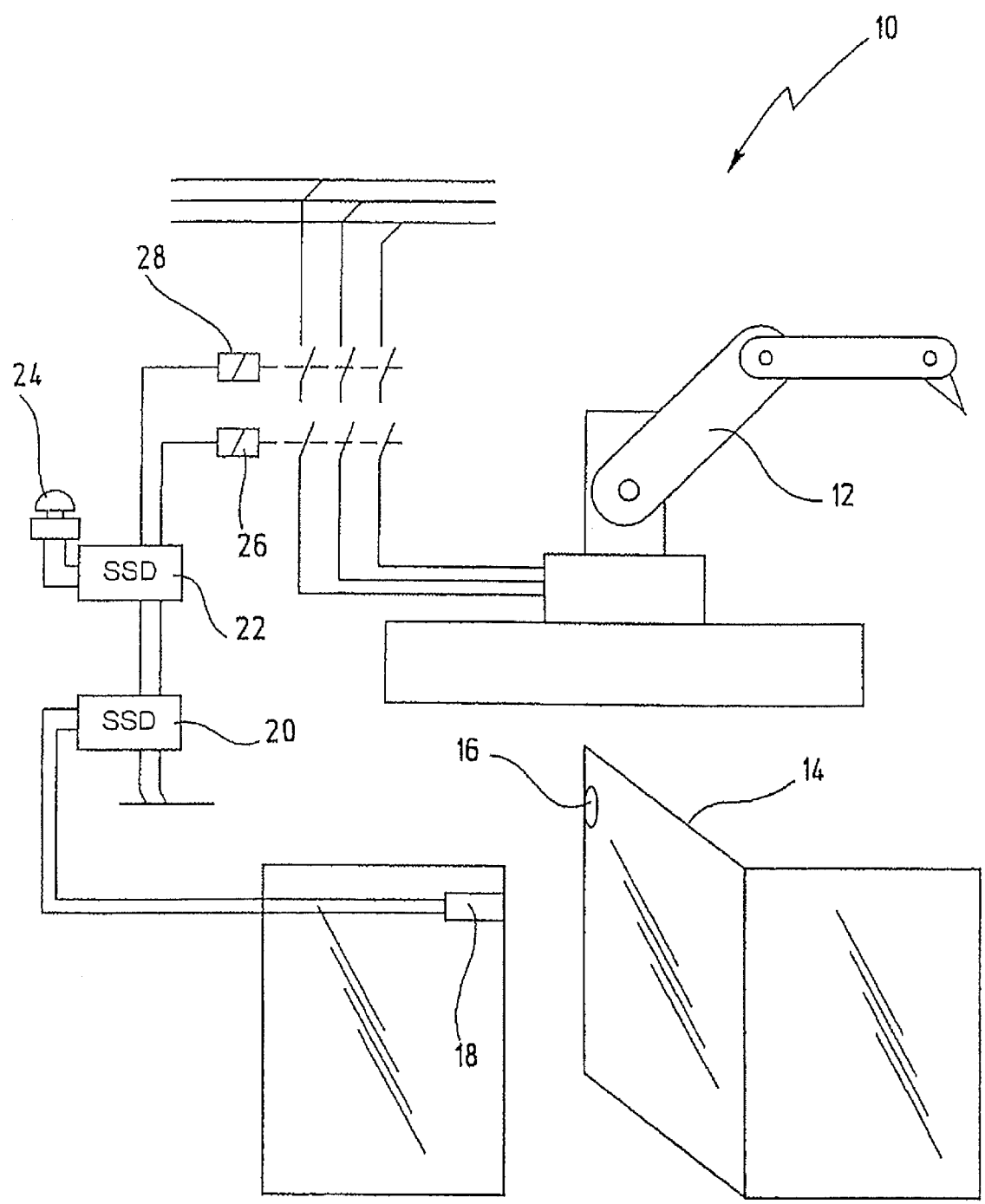
FIG. 1 shows a schematic illustration of an installation which operates in an automated manner, in which exemplary embodiments of the novel safety switching apparatus are used.

In FIG. 1, an installation in which exemplary embodiments of the invention are used is designated in its totality by the reference number 10.

The installation 10 includes a robot 12, whose working area is protected by a protective guard door 14. An actuator 16 is arranged on the protective guard door 14 and interacts with a protective guard switch 18. The protective guard switch 18 is seated on a frame, on which the moving protective guard door 14 rests in the closed state. The actuator 16 may, for example, be a transponder which can communicate with the protective guard switch 18 only when the protective guard door 14 is closed.

The protective guard switch 18 is connected to a safety switching device 20 which processes the signals from the protective guard switch 18. A second safety switching device 22, to which an emergency-off button 24 is connected as a signaling device, is arranged in series with the safety switching device 20. The safety switching devices 20, 22 are compact safety switching apparatuses in terms of the present invention, with a functional scope defined by the manufacturer.

Reference numbers 26, 28 denote two contactors whose make contacts are located in the electrical power supply path to the robot 12. The contactors 26, 28 are supplied with electrical power via the safety switching devices 20, 22, so that each of the safety switching devices 20, 22 is able to disconnect the robot 12 via the contactors 26, 28. An operational controller, which controls the standard operating procedure of the robot 12, is not illustrated for the sake of simplicity.

Figure 2:
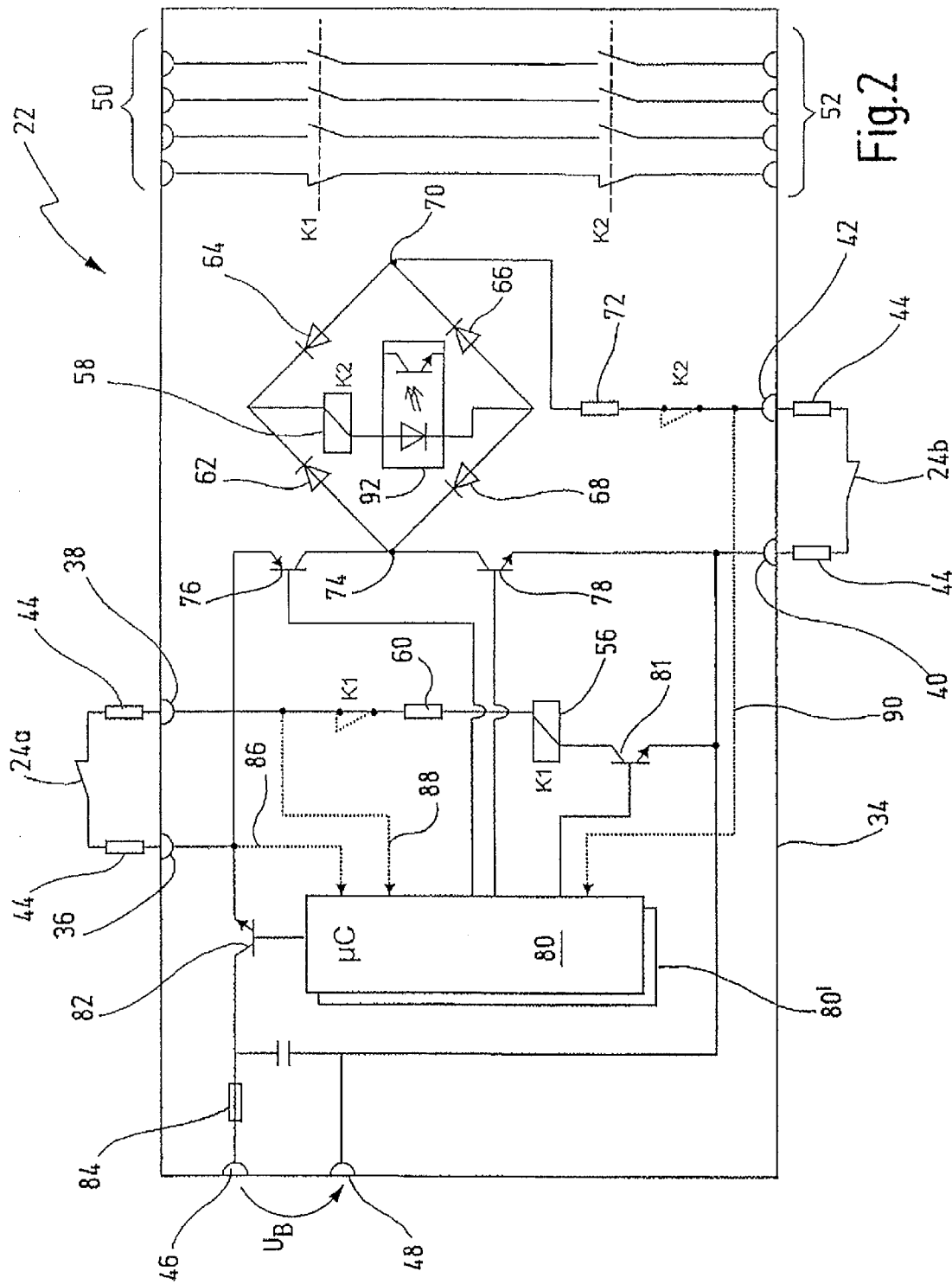
FIG. 2 shows a simplified illustration of one exemplary embodiment of the novel safety switching apparatus in the form of an equivalent circuit, showing the switched-on state.

FIG. 2 shows a preferred exemplary embodiment of the invention on the basis of the safety switching device 22. The same reference symbols denote the same elements as before.

The safety switching device 22 has a housing 34 with a plurality of connecting terminals for connection of the emergency-off button 24, the contactors 26, 28 and possible further signaling devices and actuators (not illustrated here). Reference symbols 36 and 38 denote a first and a second connecting terminal, to which a first break contact 24a of the emergency-off button 24 is connected. Reference numbers 40, 42 denote a third and a fourth connecting terminal, to which a second break contact 24b of the emergency-off button 24 is connected. Reference number 44 denotes the line resistance $R_L$ of the connecting lines via which the break contacts 24a, 24b are connected to the connecting terminals 36-42.

Two further connecting terminals 46, 48 are used to supply the safety switching device 22 with an operating voltage $U_B$ of 24 V for example. Further connecting terminals 50, 52 are provided for connection of the contactors 26, 28 and other possible loads.

In the illustrated exemplary embodiment, the safety switching device 22 has floating outputs in the form of relay contacts K1, K2, which are connected in series with one another between the connecting terminals 50, 52. In such a case, a positive potential of 24 V, for example, is connected to the connecting terminals 50, and the contactors 26, 28 are connected to the connecting terminals 52. Current can be passed to the contactors 26, 28, or the current flow can be interrupted by means of the relay contacts K1, K2. As an alternative to this preferred embodiment, the present invention may also be used for safety switching apparatuses having non-floating semiconductor outputs (related to a specific potential).

The energizing coils of the relays K1, K2 are designated by reference numbers 56, 58 in FIG. 2. As is illustrated in FIG. 2, the energizing coil 56 of relay K1 (relay 56 in the following) has one terminal connected to ground. The other terminal of relay 56 is internally (within the device) connected to the connecting terminal 38. For the sake of completeness, a make contact of the relay 56 (for self-latching) and a resistor 60 are also illustrated in this connection, wherein the resistor 60 should be understood as an equivalent resistance for any further components that are not illustrated here.

Connecting terminal 36 is connected within the device to a first steady-state potential, specifically the operating voltage $U_B$. This potential is passed to relay 56 via a break contact 24a of the emergency-off button 24.

Relay 58 is located in a diode bridge comprising four diodes 62, 64, 66, 68. A first connection 70 is connected to the connecting terminal 42 via an equivalent resistance 72 and a make contact of the relay 58. The connecting terminal 40 is connected to ground potential (the second potential here in terms of the invention).

Likewise, relay 58 is connected to ground potential via the second break contact 24b of the emergency-off button 24.

A second connection 74 of the diode network is connected to two transistors 76, 78. The second connection 74 of the diode network can be connected to the first potential (operating voltage $U_B$) via the transistor 76. Alternatively, the connection 74 can be connected to the second potential (ground) via the second transistor 78.

The reference number 80 denotes a microcontroller which, inter alia, is designed to operate the transistors 76, 78 alternatively to one another, in order to connect connection 74 either to the first potential $U_B$ or to the second potential (ground). Furthermore, the microcontroller 80 is connected to further transistors 81 and 82. Transistor 81 is connected in series with the energizing coil of relay K1. Transistor 82 is in the form of a series transistor in the supply from the supply voltage $U_B$. The microcontroller 80 can use the transistor 82 to disconnect all of the components mentioned above from the supply voltage $U_B$, inter alia resulting in tripping of the relay contacts K1, K2. Alternatively or additionally, microcontroller 80 can also switch off relays K1 and K2 via the transistors 76 and 81.

Reference number 84 denotes a PTC thermistor, which operates as a reversible fuse.

Microcontroller 80 is connected to nodes via measurement lines 86, 88, 90, and it can determine the first potential as well as a third and a fourth potential on the connecting terminals 38 and 42 at these nodes. In a preferred exemplary embodiment, microcontroller 80 has a plurality of integrated A/D converters by means of which it can measure the analog potentials. Finally, FIG. 2 shows an optocoupler 92 whose light element on the input side is connected in series with the relay 58 in the diode network. The optocoupler 92 produces an output signal when current is flowing through the relay 58, and this output signal is also supplied to the microcontroller 80 (not shown here, for clarity reasons).

Figure 3:
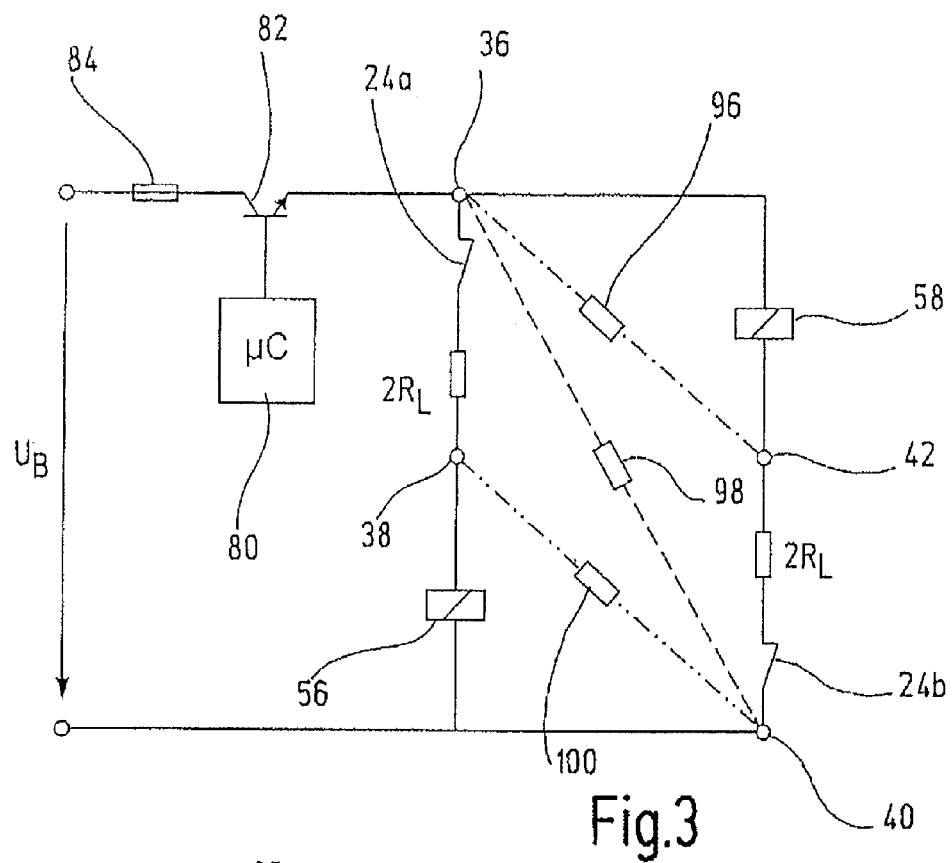
FIG. 3 shows an equivalent circuit of the safety switching apparatus from FIG. 2, with possible shorts.
Figure 4:
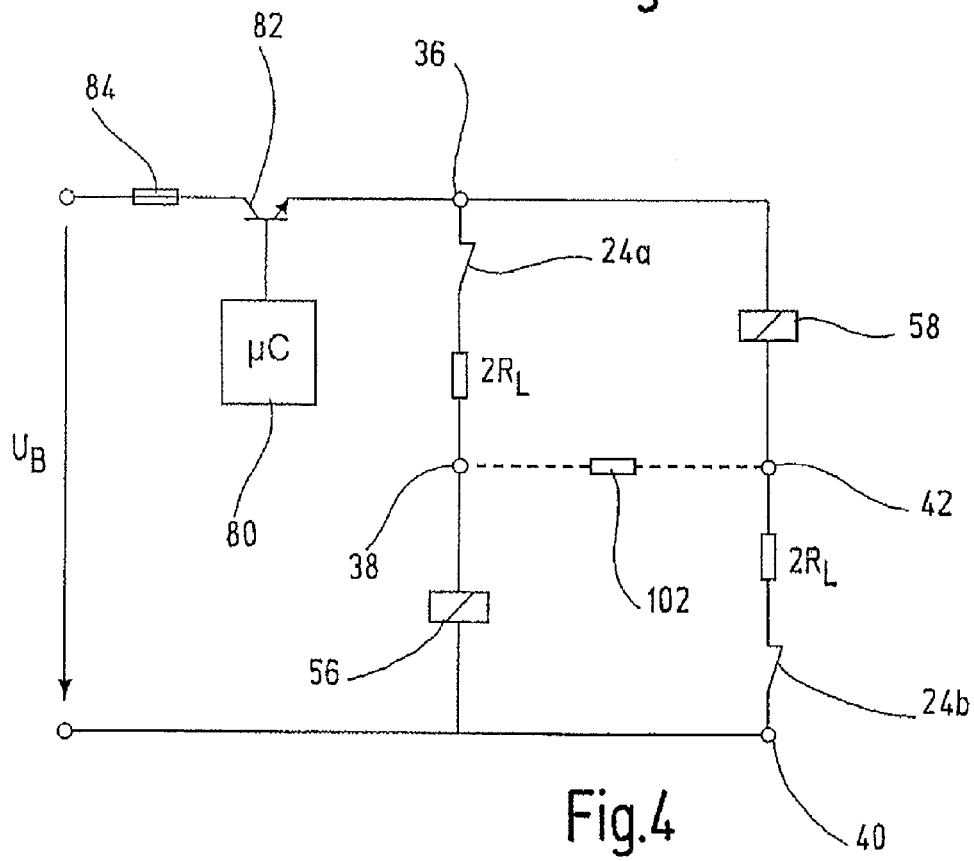
FIG. 4 shows the equivalent circuit from FIG. 3 with a further possible short.

The method of operation of the safety switching device 22 is as follows: in the switched-on, ready-to-operate state, a current flows through the break contact 24a to relay 56. Likewise, a current flows to the relay 58 via transistor 76 and diode network 62-68. The two relays 56, 58 are pulled in, i.e. the corresponding make contacts K1, K2 are closed (not shown at the output here). The relays 56, 58 are self-latched, as is sufficiently well known by relevant persons skilled in the art. FIGS. 3 and 4 show an even more simplified equivalent circuit of this operation state. Same reference symbols denote the same elements as before. For the sake of clarity, the line resistances 44 are each represented by an equivalent resistance $2R_L$.

FIG. 3 shows three possible shorts 96, 98, 100 between the connecting terminals 36-42. A further short 102 is illustrated in FIG. 4. Among these shorts, short 102 in FIG. 4 is the most dangerous since this can result in a current flowing via the relays 56, 58 even when the break contacts 24a, 24b both are open. The safety switching device 22 would therefore not be able to react, despite the signaling switches being open. The robot 12 would continue to operate even though the emergency-off button 24 had been operated. In contrast, in the event of the shorts 96, 98, 100 in FIG. 3, at least one of the relays 56, 58 has no current passing through it when the break contacts 24a, 24b of the emergency-off button 24 have been opened. Furthermore, in the event of the short 98, the protector device 84 will trip immediately, since the operating voltage $U_B$ is directly short-circuited.

The "dangerous" short 102 in FIG. 4 is identified by determining the potential on the terminals 38 and/or 42 and comparing this with the measured or known potential on the connecting terminal 36. In the event of the short 102, the potential on the connecting terminal 38 is considerably lower than without a short 102, because of the parallel path through the break contact 24b. This potential difference can easily be identified by microcontroller 80. Microcontroller 80 preferably forms and monitors a quotient of the third potential on the connecting terminal 38 and the first potential on the connecting terminal 36. In an exemplary embodiment, microcontroller 80 checks whether this quotient exceeds 0.75 (75%). If this is the case, it can be assumed that there is no short 102. Furthermore, the potential on the connecting terminal 42 in the event of the short 102 is approximately equal to the potential on the connecting terminal 38, and this is likewise monitored by microcontroller 80.

In a similar manner, a short 96 or 100 (FIG. 3), a ground fault or a short circuit to the operating voltage $U_B$ can be identified by a plausibility comparison of the potentials on the connecting terminals 36, 38 and 42. As soon as one of these situations occurs, microcontroller 80 switches off relays 56, 58 via transistors 76, 81 and/or via transistor 82. In other exemplary embodiments, transistor 82 may be omitted.

The external circuitry of the safety switching device 22 can be monitored for shorts on two channels using the described method. This is illustrated in FIG. 2 on the basis of a redundant microcontroller 80'. However, it is preferred if relay 58 is connected in parallel with the break contact 24b by means of transistors 76, 78, namely by opening transistor 76 and closing transistor 78. In this situation, if there were no shorts, no more current could flow via relay 58 since the potential would be the same on both connections 70, 74 of the diode network 62-68, namely ground in the present case. However, if a different potential occurred on one of the connections 40, 42 because of a short, this would lead to a current flow, which is identified by means of optocoupler 92 and is signaled to microcontroller 80. In this situation as well, microcontroller 80 disconnects relays 56, 58 by means of transistor 82. It is likewise possible to compare the potentials on the connecting terminals 36, 38 by means of a diode network (not illustrated here) on relay 56.

What is claimed is:

1. In safety control system for failsafe disconnection of an electrical load in an automated installation in accordance with the status of signaling devices comprising at least first and second signaling switches configured to monitor at least one fault condition associated with the automated installation, and at least one safety switching device responsive to at least one of said signaling devices for producing an output switching signal for disconnection of the load, the safety switching device comprising:
    a first and a second connecting terminal for connection to a remote first signaling switch,
    a third and a fourth connecting terminal for connection to a remote second signaling switch,
    a first and a second switching element configured to produce a redundant output switching signal for disconnection of the load, and
    a control circuit configured to control the first and second switching elements,
    wherein the first connecting terminal is supplied with a first steady-state potential,
    wherein the third connecting terminal is supplied with a second steady-state potential, which is different from the first steady-state potential,
    wherein the second connecting terminal is coupled to the first switching element forming a first circuit such that the first switching element receives the first steady-state potential via the first signaling switch,
    wherein the fourth connecting terminal is coupled to the second switching element forming a second circuit such that the second switching element receives the second steady-state potential via the second signaling switch, and
    wherein the control circuit comprises a first solid-state switching device having conductive and non-conductive states and connected to at least one of said first and second circuits to control the flow of current therethrough, and a controller having a first input connected to at least one of said second and fourth connecting terminals and a first output connected to said first solid-state switching device, and further wherein said controller is configured to determine the potential at said at least one of said second and fourth connecting terminals and control the conductive state of said first solid-state switching device in accordance with said determined potential.

2. The safety switching device of claim 1, wherein the first potential has a high magnitude, the second potential has a low magnitude, and the determined potential has a further magnitude, the controller being further configured to determine when the further magnitude is less than a defined threshold value.

3. The safety switching device of claim 1, wherein the controller is further configured to determine the first potential.

4. The safety switching device of claim 1, wherein the control circuit is of a redundant design.

5. The safety switching device of claim 1, wherein the controller comprises at least one integrated circuit which is coupled to at least one of the second and fourth connecting terminals.

6. The safety switching device of claim 5, wherein the at least one integrated circuit is a microcontroller.

7. The safety switching device of claim 1, wherein the control circuit comprises a switching unit designed to briefly connect the second switching element in parallel with the second signaling switch.

8. The safety switching device of claim 7, wherein the switching unit comprises a diode bridge in which the second switching element is arranged.

9. The safety switching device of claim 1, wherein the control circuit comprises a threshold value sensor for determining the determined potential.

10. The safety switching device of claim 9, wherein the threshold value sensor is an optocoupler.

11. The safety switching device of claim 1, further comprising an overcurrent identification element configured to open at least one of the switching elements in the event of an overcurrent in the safety switching apparatus.

12. The safety switching device of claim 11, wherein the overcurrent identification element is PTC thermistor.

13. A safety switching device for failsafe disconnection of an electrical load in an automated installation, comprising:
    a housing,
    a first and a second terminal arranged on the housing for connection to a first external signaling switch configured to monitor a fault condition associated with the automated installation,
    a third and a fourth terminal arranged on the housing for connection to a second external signaling switch configured to monitor a fault condition associated with the automated installation,
    a fifth terminal arranged on the housing for connecting the electrical load,
    a first and one second switching element arranged in the housing and configured to produce a redundant output switching signal supplied to the fifth terminal, and
    a control circuit arranged in the housing,
    wherein the first terminal is internally connected to a first steady-state potential,
    wherein the third terminal is internally connected to a second steady-state potential which is different from the first steady-state potential,
    wherein the second terminal is coupled to the first switching element forming a first circuit such that the first switching element can be connected to the first steady-state potential via the first signaling switch,
    wherein the fourth terminal is coupled to the second switching element forming a second circuit such that the second switching element can be connected to the second steady-state potential via the second signaling switch, and wherein the control circuit is configured to detect at least one further potential at the second or fourth terminal, and to control the first and second switching elements as a function of the detected further potential.

14. The safety switching device of claim 13, wherein the control circuit configured to determine the magnitude of the further potential relative to the first potential.

15. The safety switching device of claim 13, wherein the first potential is a potential with a high magnitude and the second potential is a potential with a low magnitude, and the control circuit is configured to open at least one of the switching elements when the magnitude of the further potential is less than a threshold value defined between the high and low magnitudes.

16. The safety switching device of claim 13, wherein the at least one further potential includes a third potential at the second terminal and a fourth potential at the fourth terminal.

17. The safety switching device of claim 13, wherein the control circuit is also designed to detect the first potential.

18. The safety switching device of claim 13, wherein the control circuit comprises at least one integrated circuit for detecting the further potential and for controlling the first and second switching elements, and wherein the first and second switching elements are relays each having at least one make contact, the at least one make contacts being arranged in series and connected to the fifth terminal.

19. The safety switching device of claim 13, wherein the control circuit comprises a first solid-state switching device having conductive and non-conductive states and connected to at least one of said first and second circuits to control the flow of current therethrough, and a controller having a first input connected to at least one of said second and fourth terminals and a first output connected to said first solid-state switching device, and further wherein said controller is configured to determine the further potential at said at least one of said second and fourth terminals and control the conductive state of said first solid-state switching device in accordance with said further potential.

20. The safety switching device of claim 1, wherein said first solid-state switching device is connected to said first circuit to control the flow of current through said first circuit; and further including a second solid-state switching device having conductive and non-conductive states and connected to said second circuit to control the flow of current through said second circuit.

21. The safety switching device of claim 20, wherein said controller has a second output connected to said second solid-state switching device, and further wherein said controller is configured to control the conductive state of said second solid-state switching device in accordance with said determined potential.

22. The safety switching device of claim 21, wherein the first input of said controller is connected to said second connecting terminal; and further wherein said controller has a second input connected to said fourth connecting terminal, and said controller is configured to determine a first determined potential at said second connecting terminal and a second determined potential at said fourth connecting terminal.

23. The safety switching device of claim 1, wherein said controller is configured to compare said determined potential relative to said first steady-state potential and control the conductive state of said first solid-state switching device in accordance with said comparison.

24. The safety switching device of claim 23, wherein said controller is configured to compare each of said first determined potential and said second determined potential relative to said first steady-state potential and control the conductive states of said first and second solid-state switching devices in accordance with said comparisons.

25. The safety switching device of claim 1, wherein said first and second circuits are connected in parallel across said first and third connecting terminals.

26. The safety switching device of claim 13, wherein said first and second circuits are connected in parallel across said first and third terminals.

\* \* \* \* \*